United States Patent
Yanagisawa et al.

(10) Patent No.: US 10,118,224 B2
(45) Date of Patent: Nov. 6, 2018

(54) METHOD FOR PRODUCING NICKEL POWDER

(71) Applicants: KOCHI UNIVERSITY, NATIONAL UNIVERSITY CORPORATION, Kochi-shi, Kochi (JP); SUMITOMO METAL MINING CO., LTD., Tokyo (JP)

(72) Inventors: Kazumichi Yanagisawa, Kochi (JP); Junhao Zhang, Kochi (JP); Shin-ichi Heguri, Niihama (JP); Hideki Ohara, Niihama (JP); Osamu Ikeda, Niihama (JP); Tomoaki Yoneyama, Niihama (JP); Yohei Kudo, Niihama (JP); Yoshitomo Ozaki, Niihama (JP)

(73) Assignees: KOCHI UNIVERSITY, NATIONAL UNIVERSITY CORPORATION, Kochi-Shi, Kochi (JP); SUMITOMO METAL MINING CO., LTD., Tokyo (JP)

( * ) Notice: Subject to any disclaimer, the term of this patent is extended or adjusted under 35 U.S.C. 154(b) by 136 days.

(21) Appl. No.: 15/114,218

(22) PCT Filed: Jan. 27, 2015

(86) PCT No.: PCT/JP2015/052205
§ 371 (c)(1),
(2) Date: Jul. 26, 2016

(87) PCT Pub. No.: WO2015/115427
PCT Pub. Date: Aug. 6, 2015

(65) Prior Publication Data
US 2017/0008083 A1 Jan. 12, 2017

(30) Foreign Application Priority Data
Jan. 30, 2014 (JP) ................................ 2014-016143

(51) Int. Cl.
B22F 9/26 (2006.01)
B22F 3/10 (2006.01)
(Continued)

(52) U.S. Cl.
CPC .............. *B22F 3/10* (2013.01); *B22F 1/0003* (2013.01); *B22F 9/26* (2013.01); *C01C 1/028* (2013.01);
(Continued)

(58) Field of Classification Search
None
See application file for complete search history.

(56) References Cited

U.S. PATENT DOCUMENTS 3,156,556 A 11/1964 Meddings et al.
3,816,098 A * 6/1974 Mackiw .............. C22B 23/0446
75/370
(Continued)

FOREIGN PATENT DOCUMENTS

JP 2005-240164 9/2005
JP 2006-152344 6/2006
(Continued)

OTHER PUBLICATIONS

International Search Report, dated Apr. 28, 2015 in PCT/Jp2015/055205.
(Continued)

*Primary Examiner* — George Wyszomierski
(74) *Attorney, Agent, or Firm* — Gerald E. Hespos; Michael J. Porco; Matthew T. Hespos

(57) ABSTRACT

Provided is a method for producing nickel powder from a nickel ammine sulfate complex solution, comprising treatment steps of: (1) a seed crystal production step of producing nickel powder having an average particle size of 0.1 to 5 µm; (2) a seed crystal addition step of adding the nickel powder
(Continued)

obtained in the step (1) as seed crystals to form a mixed slurry; (3) a reduction step of forming a reduced slurry containing nickel powder formed by precipitation of a nickel component in the mixed slurry on the seed crystals; and (4) a growth step of performing solid-liquid separation to separate and recover the nickel powder as a solid phase component and then blowing hydrogen gas into a solution prepared by adding the nickel ammine sulfate complex solution to the recovered nickel powder to grow the nickel powder to form high purity nickel powder.

19 Claims, 1 Drawing Sheet

(51) Int. Cl.
  *B22F 1/00*   (2006.01)
  *C01C 1/02*   (2006.01)
  *C01C 1/244*  (2006.01)
  *C22B 3/00*   (2006.01)
  *C22B 3/26*   (2006.01)
  *B22F 9/24*   (2006.01)

(52) U.S. Cl.
  CPC ............ *C01C 1/244* (2013.01); *C22B 3/0005* (2013.01); *C22B 23/0407* (2013.01); *C22B 23/0461* (2013.01); *C22B 23/0476* (2013.01); *B22F 9/24* (2013.01); *B22F 2009/245* (2013.01); *B22F 2301/15* (2013.01); *B22F 2998/10* (2013.01); *B22F 2999/00* (2013.01); *Y02P 10/234* (2015.11)

(56) References Cited

U.S. PATENT DOCUMENTS

| | | |
|---|---|---|
| 5,584,908 A | 12/1996 | Scheie |
| 6,120,576 A | 9/2000 | Toshima et al. |
| 9,700,942 B2* | 7/2017 | Yoneyama ............... B22F 9/26 |
| 2005/0211022 A1* | 9/2005 | Roche .................... C22B 3/001 |
| | | 75/715 |
| 2010/0031775 A1* | 2/2010 | Seo ........................... B22F 9/24 |
| | | 75/364 |
| 2013/0008286 A1* | 1/2013 | Yamada ................... B22F 9/24 |
| | | 75/345 |

FOREIGN PATENT DOCUMENTS

| | | |
|---|---|---|
| JP | 2010-509213 | 3/2010 |
| JP | 2010-242143 | 10/2010 |

OTHER PUBLICATIONS

Japanese Office Action, dated Jul. 30, 2015 in Japanese Application 2014-016143.

European Office Action dated Dec. 4, 2017.

* cited by examiner

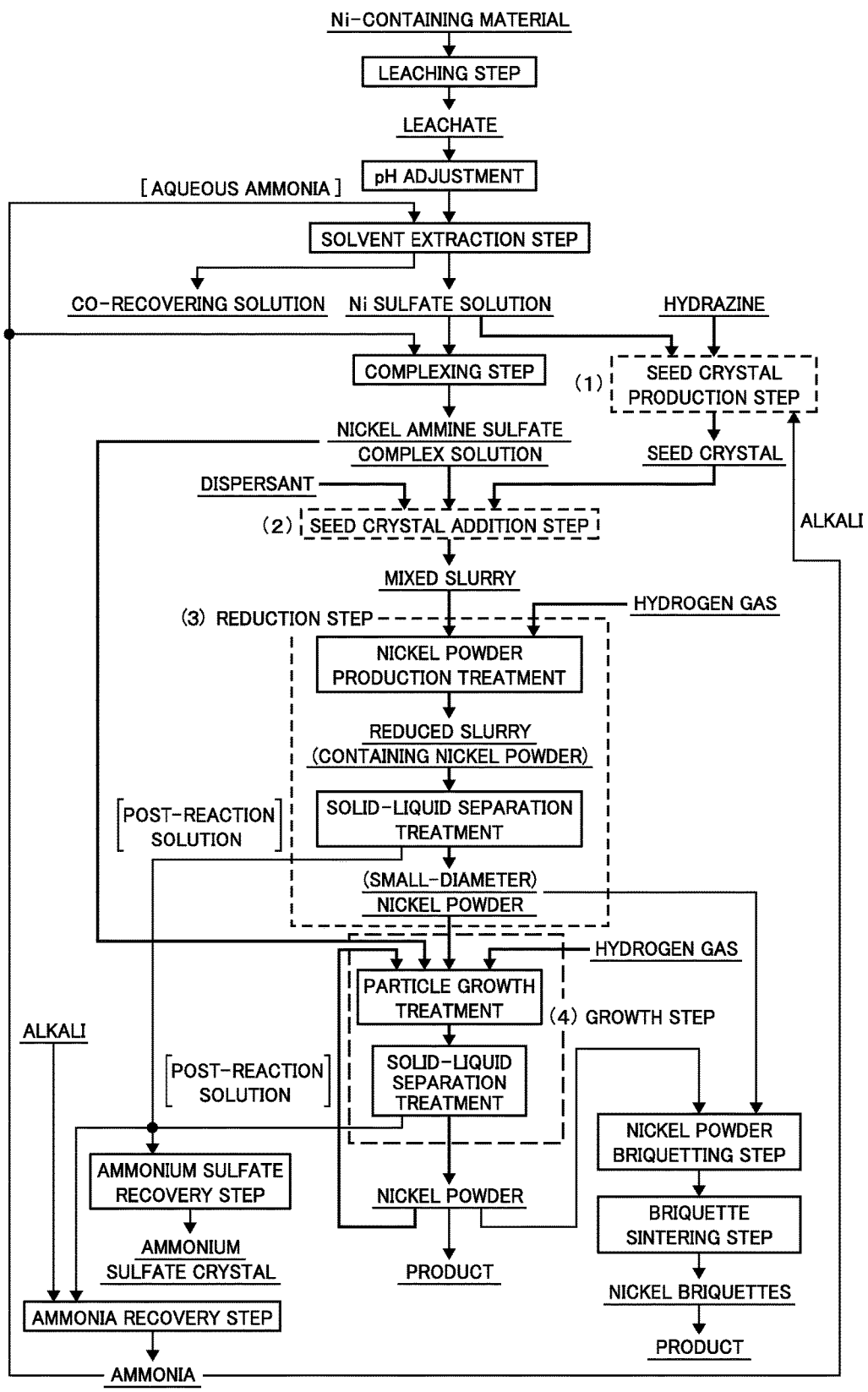

METHOD FOR PRODUCING NICKEL POWDER

BACKGROUND

1. Field of the Invention

The present invention relates to a method for obtaining high purity nickel powder from a nickel ammine sulfate complex solution and briquettes prepared by pressing the powder.

Particularly, the present invention can be applied to a treatment of an in-process intermediate solution generated from a nickel hydrometallurgical process.

2. Description of the Related Art

A method for industrially producing nickel powder using a hydrometallurgical process includes a method for producing nickel powder by dissolving a raw material in a sulfuric acid solution followed by removing impurities to obtain a nickel sulfate solution, adding ammonia to the resulting nickel sulfate solution to form an ammine complex of nickel, and feeding hydrogen gas into the produced nickel ammine sulfate complex solution to reduce nickel.

For example, Japanese Patent Laid-Open No. 2005-240164 describes a process for producing nickel powder by adding an iron compound as seed crystals during the reduction reaction to precipitate nickel on the iron compound, and the problem is that iron derived from the seed crystals is mixed into the product.

Further, a method for obtaining nickel powder using a reducing agent other than hydrogen gas has also been proposed.

For example, Japanese Patent Laid-Open No. 2005-240164 discloses nickel powder which is inexpensive, is excellent in weatherability, has low electric resistance in a state where it is kneaded with a resin, reduces initial electric resistance and electric resistance in use, can be stably used over a long period of time, and is suitable as conductive particles for a conductive paste and a conductive resin, and a method for producing the nickel powder.

The nickel powder disclosed in Japanese Patent Laid-Open No. 2005-240164 contains 1 to 20% by mass of cobalt with the balance consisting of nickel and unavoidable impurities, comprises secondary particles in which primary particles are aggregated, and has an oxygen content of 0.8% by mass or less. The reference teaches that cobalt is contained only in the surface layer part of the secondary particles, and the cobalt content in the surface layer part is preferably 1 to 40% by mass. When the nickel powder is intended to be obtained by the disclosed production method, cobalt will coexist. Therefore, the method is not suitable for an application in which nickel and cobalt are present in combination, for example, in a nickel oxide ore; these metals are separated; and each metal is intended to be economically recovered as high purity metal.

Further, Japanese Patent Laid-Open No. 2010-242143 provides a method for producing metal powder by a liquid phase reduction method that is improved so that a particle aggregate may be hardly produced.

The method for producing metal powder comprises a first step of dissolving a metal compound, a reducing agent, a complexing agent, and a dispersant to prepare an aqueous solution containing metal ions derived from the metal compound, and a second step of adjusting the pH of the aqueous solution to reduce the metal ions with the reducing agent to precipitate the metal powder.

However, this production method requires high cost since an expensive chemical is used, and is not economically advantageous for applying the method to a process operated on a large scale as the above nickel smelting.

Although various processes for producing nickel powder have been proposed as described above, a method for producing high purity nickel powder using industrially inexpensive hydrogen gas has not been proposed.

In such a situation, the present invention intends to provide a production method for producing coarse particles of high purity nickel powder from a nickel ammine sulfate complex solution using fine nickel powder and using industrially inexpensive hydrogen gas.

SUMMARY

A first aspect of the present invention to solve such a problem is a method for producing nickel powder from a nickel ammine sulfate complex solution, comprising the following treatment steps of: (1) a seed crystal production step of mixing a nickel sulfate solution and hydrazine to produce nickel powder having an average particle size of 0.1 to 5 μm serving as seed crystals; (2) a seed crystal addition step of adding the nickel powder having an average particle size of 0.1 to 5 μm obtained in the step (1) as seed crystals to the nickel ammine sulfate complex solution to form a mixed slurry; (3) a reduction step of blowing hydrogen gas into the mixed slurry obtained in the seed crystal addition step (2) to form a reduced slurry containing nickel powder formed by precipitation of a nickel component in the mixed slurry on the seed crystals; and (4) a growth step of subjecting the reduced slurry obtained in the reduction step (3) to solid-liquid separation to separate and recover the nickel powder as a solid phase component and then blowing hydrogen gas into a solution prepared by adding the nickel ammine sulfate complex solution to the recovered nickel powder to grow the nickel powder to form high purity nickel powder.

A second aspect of the present invention is a method for producing nickel powder according to the first aspect, wherein an alkali is further mixed when a nickel sulfate solution and hydrazine are mixed in the seed crystal production step (1).

A third aspect of the present invention is a method for producing nickel powder according to the first and second aspects, wherein a dispersant is further added to the mixed slurry when the seed crystals are added to the nickel ammine sulfate complex solution to form a mixed slurry in the seed crystal addition step (2).

A fourth aspect of the present invention is a method for producing nickel powder according to the first to the third aspects, wherein, in the seed crystal addition step (2), an amount of the seed crystals added is 1 to 100% based on a weight of nickel in the nickel ammine sulfate complex solution.

A fifth aspect of the present invention is a method for producing nickel powder according to the first to the fourth aspects, wherein the nickel ammine sulfate complex solution is obtained by a leaching step of dissolving a nickel-containing material containing cobalt as an impurity; a solvent extraction step of adjusting pH of a leachate containing nickel and cobalt obtained in the leaching step and then separating the leachate into a nickel sulfate solution and a cobalt-recovering solution by solvent extraction; and a complexing step of subjecting the nickel sulfate solution to complexing treatment with ammonia.

A sixth aspect of the present invention is a method for producing nickel powder according to the fifth aspect, wherein the nickel-containing material is at least one powder of nickel and cobalt mixed sulfide, crude nickel sulfate, nickel oxide, nickel hydroxide, nickel carbonate, and metallic nickel.

A seventh aspect of the present invention is a method for producing nickel powder according to the fifth and the sixth aspects, wherein 2-ethylhexylphosphonic acid mono-2-ethylhexyl ester or di-(2,4,4-trimethylpentyl)phosphinic acid is used in the solvent extraction method.

A eighth aspect of the present invention is a method for producing nickel powder according to the fifth to the seventh aspects, wherein a concentration of ammonium sulfate in the nickel ammine sulfate complex solution is 100 to 500 g/l, and an ammonium concentration is 1.9 or more in a molar ratio based on a concentration of nickel in the nickel ammine sulfate complex solution.

A ninth aspect of the present invention is a method for producing nickel powder according to the first and the second aspects, wherein the nickel sulfate solution in the seed crystal production step (1) corresponds to the nickel sulfate solution produced by the solvent extraction step according to the fifth aspect.

A tenth aspect of the present invention is a method for producing nickel powder according to the first aspect, wherein the reduction step (3) and the growth step (4) are performed by maintaining the temperature in the range of 150 to 200° C. and the pressure in the range of 1.0 to 4.0 MPa.

An eleventh aspect of the present invention is a method for producing nickel powder according to the third and the fourth aspects, wherein the dispersant contains sulfonate.

A twelfth aspect of the present invention is a method for producing nickel powder according to the first aspect, further comprising: a nickel powder briquetting step of processing the high purity nickel powder obtained in the growth step (4) into nickel briquettes in a massive form using a briquetting machine; and a briquette sintering step of sintering the resulting nickel briquettes in a massive form under holding conditions at a temperature of 500 to 1200° C. in a hydrogen atmosphere to form nickel briquettes as a sintered body.

A thirteenth aspect of the present invention is a method for producing nickel powder according to the first aspect, further comprising an ammonium sulfate recovery step of concentrating a post-reaction solution obtained after separating nickel powder as a solid phase component by the solid-liquid separation in the reduction step (3) and in the growth step (4) to precipitate ammonium sulfate to recover ammonium sulfate crystals.

A fourteenth aspect of the present invention is a method for producing nickel powder according to the first aspect, further comprising an ammonia recovery step of adding an alkali to a post-reaction solution obtained after separating nickel powder as a solid phase component by the solid-liquid separation in the reduction step (3) and in the growth step (4) and heating the resulting mixture to volatilize and recover ammonia gas.

A fifteenth aspect of the present invention is a method for producing nickel powder according to the fourteenth aspect, wherein the ammonia recovered in the ammonia recovery step is recycled as ammonia used for producing the nickel ammine sulfate complex solution used in the solvent extraction step and the complexing step according to the fifth aspect, and as ammonia as an alkali used for mixing in the seed crystal production step (1) according to the second aspect.

According to the present invention, a method for producing nickel powder with hydrogen gas from a nickel ammine sulfate complex solution can easily obtain high purity nickel powder by using seed crystals which do not pollute the product and can achieve an industrially remarkable effect.

BRIEF DESCRIPTION OF DRAWING

FIG. 1 is a production flow chart of nickel powder according to the present invention.

DETAILED DESCRIPTION

In the present invention, high purity nickel powder containing a smaller amount of impurities is produced from a nickel ammine sulfate complex solution by subjecting a process solution of the hydrometallurgical process to the following steps (1) to (4), in the method for obtaining nickel powder from a nickel ammine sulfate complex solution.

Hereinafter, the method for producing high purity nickel powder according to the present invention will be described with reference to the production flow chart of high purity nickel powder according to the present invention shown in FIG. 1.

[Leaching Step]

First, the leaching step is a step of dissolving a nickel-containing material, serving as a starting material, such as an industrial intermediate comprising one or more selected from nickel and cobalt mixed sulfide, crude nickel sulfate, nickel oxide, nickel hydroxide, nickel carbonate, and nickel powder with sulfuric acid to leach nickel to produce a leachate (solution containing nickel), and is performed by a known method disclosed, for example, in Japanese Patent Laid-Open No. 2005-350766.

[Solvent Extraction Step]

Next, the leachate is pH-adjusted, and the resulting leachate is subjected to the solvent extraction step.

This step is a step of bringing an organic phase into contact with the leachate, which is obtained in the leaching step and then subjected to pH adjustment, to exchange the components in each phase, thereby increasing the concentration of some components in an aqueous phase and reducing the concentration of other different components.

In the present invention, 2-ethylhexylphosphonic acid mono-2-ethylhexyl ester or di-(2,4,4-trimethylpentyl)phosphinic acid is used as the organic phase to selectively extract impurity elements, particularly cobalt, in the leachate to obtain a high purity nickel sulfate solution.

Further, aqueous ammonia produced in the ammonia recovery step to be described below can be used as the aqueous ammonia used for the pH adjustment during this step.

[Complexing Step]

The complexing step is a step of adding ammonia in the form of ammonia gas or aqueous ammonia to the high purity nickel sulfate solution obtained in the solvent extraction step to subject the solution to complexing treatment to produce a nickel ammine sulfate complex which is an ammine complex of nickel, thus forming a nickel ammine sulfate complex solution thereof.

The ammonia is added so that the ammonium concentration at this time may be 1.9 or more in a molar ratio based on the concentration of nickel in the solution. If the ammonium concentration of the ammonia to be added is less than 1.9, nickel will not form an ammine complex, but a precipitate of nickel hydroxide will be produced.

Further, in order to adjust the concentration of ammonium sulfate, ammonium sulfate can be added in this step. The concentration of ammonium sulfate at this time is preferably 100 to 500 g/L. If the concentration exceeds 500 g/L, solubility will be exceeded to precipitate crystals, and it is difficult to achieve a concentration of less than 100 g/L in terms of the metal balance in the process.

Further, ammonia gas or aqueous ammonia produced in the ammonia recovery step to be described below can be used also as the ammonia gas or aqueous ammonia used in this step.

[Steps of Producing Nickel Powder from Nickel Ammine Sulfate Complex Solution]

The steps of producing nickel powder from the nickel ammine sulfate complex solution shown by the treatment steps (1) to (4) surrounded by broken lines in FIG. 1 will be described below. Note that black bold arrows in the FIGURE show the process flows in these steps.

(1) Seed Crystal Production Step

This is the step of producing fine nickel powder as seed crystals by mixing hydrazine with the high purity nickel sulfate solution obtained in the above solvent extraction step.

At this time, an alkali may be further mixed, and as the alkali to be used, ammonia may be added in an amount twice or more the amount of nickel in the nickel sulfate solution in a molar ratio, and the pH may be adjusted to 7 to 12 using caustic soda.

Further, the amount of hydrazine added is preferably 0.5 to 2.5 times the amount of nickel in the nickel sulfate in a molar ratio. If the amount is less than 0.5 time, nickel will not completely react, and even if the amount exceeds 2.5 times, reaction efficiency will not be affected but the loss of chemicals will increase.

Further, reaction temperature is preferably 25 to 80° C. If the temperature is less than 25° C., reaction time will increase, and the industrial application of the long reaction time will not be realistic. On the other hand, if the temperature exceeds 80° C., the material of a reaction vessel will be limited to increase the cost of equipment. Further, the particle size of the nickel powder produced can be reduced by adding a small amount of surfactant at this time.

The fine nickel powder having an average particle size of 0.1 to 5 μm produced in this way, which is used as seed crystals, is subjected to solid-liquid separation and fed to the next step as a nickel powder slurry in a slurry state.

(2) Seed Crystal Addition Step

The nickel powder having an average particle size of 0.1 to 5 μm obtained in the seed crystal production step (1) is added as seed crystals in the form of a nickel powder slurry to the nickel ammine sulfate complex solution obtained in the above complexing step to form a mixed slurry containing seed crystals.

The weight of the seed crystals added at this time is preferably 1 to 100% based on the weight of nickel in the nickel ammine sulfate complex solution. If the weight of the seed crystals is less than 1%, the reaction efficiency during the reduction in the next step will be significantly reduced. Further, if the weight of the seed crystals exceeds 100%, the amount of the seed crystals used will be a large amount, which requires much cost for producing seed crystals and is not economical.

Further, a dispersant may be added at the same time. Since the seed crystals are dispersed by adding the dispersant, the efficiency of the following reduction step can be increased.

The dispersant used here is not particularly limited as long as it has a sulfonate, but a lignosulfonate is preferred as a dispersant that can be industrially inexpensively obtained.

(3) Reduction Step

Hydrogen gas is blown into the mixed slurry obtained in the seed crystal addition step (2) to precipitate nickel in the solution on the seed crystals. At this time, reaction temperature is preferably 150 to 200° C. If the temperature is less than 150° C., reduction efficiency will be reduced, and even if the temperature exceeds 200° C., there will be no influence on the reaction, and the loss of thermal energy and the like will increase.

Further, the pressure during the reaction is preferably 1.0 to 4.0 MPa. If the pressure is less than 1.0 MPa, reaction efficiency will be reduced, and even if the pressure exceeds 4.0 MPa, there will be no influence on the reaction, and the loss of hydrogen gas will increase.

In the solution of the mixed slurry obtained in the seed crystal addition step (2), magnesium ions, sodium ions, sulfate ions, and ammonium ions are mainly present as impurities, but since all the ions remain in the solution, high purity nickel powder can be produced.

(4) Growth Step

The reduced slurry produced in the reduction step (3) is subjected to solid-liquid separation. Then, to the recovered high purity nickel powder, is added the nickel ammine sulfate complex solution obtained in the complexing step described above, followed by feeding hydrogen gas according to the method of the step (3). Since nickel is thereby reduced and precipitated on the high purity nickel powder, the particles can be grown.

Further, high purity nickel powder having higher bulk density and a larger particle size can be produced by repeating this growth step a plurality of times.

Further, the resulting nickel powder may be finished into the shape of briquettes that are coarser, not easily oxidized, and easily handled through the following nickel powder briquetting step and briquette baking step.

Furthermore, an ammonia recovery step may be provided.

[Nickel Powder Briquetting Step]

The high purity nickel powder produced by the present invention is dried and then processed for shaping with a briquetting machine or the like to obtain nickel briquettes in a block form as a product form.

Further, in order to improve the processability to form the briquettes, a material that does not impair the product quality such as water may be added as a binder to the nickel powder depending on the case.

[Briquette Sintering Step]

The nickel briquettes prepared in the briquetting step is subjected to roasting and sintering in a hydrogen atmosphere to prepare a briquette sintered compact. This treatment is performed for increasing the strength and removing ammonia and a sulfur component remaining in a very small amount, and the roasting and sintering temperature of the treatment is preferably 500 to 1200° C. If the temperature is less than 500° C., the sintering will be insufficient, and even if the temperature exceeds 1200° C., the efficiency will hardly change but the loss of energy will increase.

[Ammonium Sulfate Recovery Step]

Ammonium sulfate and ammonia are contained in the post-reaction solution produced by the solid-liquid separation treatment for separating nickel powder as a solid phase in the reduction step (3) and the growth step (4).

Thus, ammonium sulfate can be recovered as ammonium sulfate crystals by subjecting the post-reaction solution to the ammonium sulfate recovery step, in which the post-reaction solution is heated and concentrated to precipitate ammonium sulfate.

[Ammonia Recovery Step]

Further, an alkali is added to the post-reaction solution to adjust the pH to 10 to 13, and then the resulting solution can be heated to volatilize ammonia gas to recover ammonia.

The alkali used here suitably includes, but is not limited to, caustic soda and slaked lime, because they are industrially inexpensive.

Further, the recovered ammonia gas can produce aqueous ammonia by bringing it into contact with water, and the resulting aqueous ammonia can be repeatedly used in the process.

EXAMPLES

The present invention will be described below in more detail using Examples.

Example 1

(1) Seed Crystal Production Step

To 73 ml of 25% aqueous ammonia, were added 36 g of sodium hydroxide and 53 ml of a 60% hydrazine solution, and the total volume of the solution was adjusted to 269 ml.

While holding the resulting solution at a temperature of 75° C. with stirring using a water bath, 273 g of nickel sulfate solution (100 g/L) was dropwise added to the solution in a beaker to allow the components to react with each other, and the reaction mixture was held for 30 minutes. Subsequently, the reaction mixture was subjected to solid-liquid separation, and the produced nickel powder was recovered. The average particle size of the resulting nickel powder was 2 μm.

(2) Seed Crystal Addition Step

To a solution containing a nickel sulfate solution having 75 g of nickel, and 330 g of ammonium sulfate, was added 191 ml of 25% aqueous ammonia, and the total volume of the solution was adjusted to 1000 ml. To the resulting solution, was added 7.5 g of nickel powder obtained in the above (1) as seed crystals to prepare a mixed slurry.

(3) Reduction Step

The mixed slurry prepared in (2) was heated to 185° C. with stirring in an autoclave, and hydrogen gas was blown and fed into the mixed slurry so that the pressure in the autoclave became 3.5 MPa to subject the mixed slurry to nickel powder production treatment which is reduction treatment.

After the lapse of one hour from the start of feeding hydrogen gas, the feed of hydrogen gas was stopped, and the autoclave was cooled. A reduced slurry obtained after cooling was subjected to solid-liquid separation by filtration to recover high purity nickel powder having a small diameter. The nickel powder recovered at this time was 70 g.

(4) Growth Step

Next, 191 ml of 25% aqueous ammonia was added to a solution containing 336 g of nickel sulfate and 330 g of ammonium sulfate, and the total volume of the solution was adjusted to 1000 ml.

To the resulting solution, was added the entire amount of the high purity nickel powder having a small diameter obtained in the above (3) to prepare a slurry.

The slurry was heated to 185° C. with stirring in an autoclave, and hydrogen gas was blown and fed into the slurry so that the pressure in the autoclave became 3.5 MPa.

After the lapse of one hour from the start of feeding hydrogen gas, the feed of hydrogen gas was stopped, and the autoclave was cooled. A slurry obtained after cooling was subjected to solid-liquid separation by filtration to recover high purity nickel powder having grown particles.

Example 2

To 1000 ml of a nickel ammine sulfate complex solution shown in Table 1, was added 75 g of nickel powder having an average particle size of 1 μm as seed crystals. Then, the resulting mixture was heated to 185° C. with stirring in an autoclave, and hydrogen gas was blown and fed into the mixture so that the pressure in the autoclave became 3.5 MPa.

After the lapse of one hour from the start of feeding hydrogen gas, the feed of hydrogen gas was stopped, and the autoclave was cooled. A slurry obtained after cooling was subjected to solid-liquid separation by filtration to recover nickel powder, which was washed with pure water and then analyzed for the impurity content in the nickel powder. The results are shown in Table 1. The mixing of Mg and Na into the nickel powder was not observed, and high purity Ni powder was able to be produced.

TABLE 1

|  | Ni | Mg | Na |
| --- | --- | --- | --- |
| Nickel ammine sulfate complex solution | 75 [g/L] | 0.1 [g/L] | 7.0 [g/L] |
| High purity nickel powder | — | <0.005% | <0.005% |

Example 3

To a solution containing 22.5 g of seed crystals prepared in "seed crystal production step (1)" of Example 1, 1.5 g of sodium lignosulfonate, 336 g of nickel sulfate, and 330 g of ammonium sulfate, was added 191 ml of 25% aqueous ammonia, and the total volume of the mixture was adjusted to 1000 ml to prepare a mixed slurry.

Next, the mixed slurry was heated to 185° C. with stirring in an autoclave, and hydrogen gas was blown and fed into the slurry so that the pressure in the autoclave became 3.5 MPa. After the lapse of one hour from the start of feeding hydrogen gas, the feed of hydrogen gas was stopped. After the autoclave was cooled, the resulting slurry was subjected to solid-liquid separation by filtration to recover nickel powder. At this time, the nickel concentration in the post-reaction solution was 0.4 g/l, and a rate of reduction of 99% or more was obtained.

Example 4

To a solution containing 336 g of nickel sulfate and 330 g of ammonium sulfate, was added 191 ml of 25% aqueous ammonia, and the total volume of the mixture was adjusted to 1000 ml, to which was added 75 g of nickel powder having a particle size adjusted to 1 μm to prepare a mixed slurry.

The mixed slurry was heated to 185° C. with stirring in an autoclave, and hydrogen gas was blown and fed into the mixed slurry so that the pressure in the autoclave became 3.5 MPa to subject the mixed slurry to nickel powder growing treatment which is reduction step.

After the lapse of one hour from the start of feeding hydrogen gas, the feed of hydrogen gas was stopped. After the autoclave was cooled, the resulting reduced slurry was subjected to solid-liquid separation by filtration to recover nickel powder having a small diameter.

To a solution containing the recovered nickel powder having a small diameter, 336 g of nickel sulfate, and 330 g of ammonium sulfate, was added 191 ml of 25% aqueous ammonia, and the total volume of the mixture was adjusted to 1000 ml. The mixture was again heated to 185° C. with stirring in an autoclave, and hydrogen gas was blown and fed into the mixture so that the pressure in the autoclave became 3.5 MPa to subject the mixture to particle growth treatment. Then, the mixture after the treatment was subjected to solid-liquid separation by filtration to recover nickel powder having grown particles.

This operation was repeated 10 times to further grow nickel powder.

The nickel powder obtained in this way had a sulfur grade of 0.04%.

The nickel powder was heated to 1000° C. in a 2% hydrogen atmosphere and held for 60 minutes. Nickel powder obtained after the holding had a sulfur content of 0.008%, and the sulfur grade could be reduced by roasting.

Comparative Example 1

An autoclave was charged with a solution prepared by mixing 45 ml of pure water, 20 g of nickel sulfate hexahydrate, 15 g of ammonium sulfate, and 10 ml of 28% aqueous ammonia without adding seed crystals, and thereto was fed hydrogen gas to 3.5 MPa with stirring, followed by heating to 185° C. followed by holding the temperature for 6 hours. After cooling, when the inside of the autoclave was checked, a deposit adhered to the container and impellers as a scale, and powdered nickel was not able to be produced.

Comparative Example 2

The reduction step was performed under the same conditions as in Example 3 except that sodium lignosulfonate was not added. As a result, the nickel powder that was able to be recovered was 33 g, and the rate of recovery was at most 14%.

The invention claimed is:

1. A method for producing nickel powder from a nickel ammine sulfate complex solution, the method comprising treatment steps of:
   (1) a seed crystal production step of mixing a nickel sulfate solution and hydrazine to produce nickel powder having an average particle size of 0.1 to 5 µm serving as seed crystals;
   (2) a seed crystal addition step of adding the nickel powder having an average particle size of 0.1 to 5 µm obtained in the step (1) as seed crystals to the nickel ammine sulfate complex solution to form a mixed slurry;
   (3) a reduction step of blowing hydrogen gas into the mixed slurry obtained in the seed crystal addition step (2) to form a reduced slurry by precipitation of a nickel component in the mixed slurry on the seed crystals; and
   (4) a growth step of subjecting the reduced slurry formed in the reduction step (3) to solid-liquid separation to separate the nickel component in the reduced slurry to form a recovered nickel powder as a solid phase component and then blowing hydrogen gas into a solution prepared by adding the nickel ammine sulfate complex solution to the recovered nickel powder and thereby causing the recovered nickel powder to grow and form high purity nickel powder.

2. The method for producing nickel powder according to claim 1, wherein an alkali is further mixed when a nickel sulfate solution and hydrazine are mixed in the seed crystal production step (1).

3. The method for producing nickel powder according to claim 2, wherein a dispersant is further added to the mixed slurry when the seed crystals are added to the nickel ammine sulfate complex solution to form a mixed slurry in the seed crystal addition step (2).

4. The method for producing nickel powder according to claim 3, wherein, in the seed crystal addition step (2), an amount of the seed crystals added is 1 to 100% based on a weight of nickel in the nickel ammine sulfate complex solution.

5. The method for producing nickel powder according to claim 4, wherein the dispersant contains a sulfonate.

6. The method for producing nickel powder according to claim 2 the nickel ammine sulfate complex solution is obtained by:
   a leaching step of dissolving a nickel-containing material containing cobalt as an impurity;
   a solvent extraction step of adjusting pH of a leachate containing nickel and cobalt obtained in the leaching step and then separating the leachate into a nickel sulfate solution and a cobalt-recovering solution by solvent extraction; and
   a complexing step of subjecting the nickel sulfate solution to complexing treatment with ammonia.

7. The method for producing nickel powder according to claim 6, wherein the nickel-containing material is at least one powder of nickel and cobalt mixed sulfide, crude nickel sulfate, nickel oxide, nickel hydroxide, nickel carbonate, and metallic nickel.

8. The method for producing the nickel powder according to claim 6, wherein 2-ethylhexylphosphonic acid mono-2-ethylhexyl ester or di-(2,4,4-trimethylpentyl)phosphinic acid is used in the solvent extraction.

9. The method for producing nickel powder according to claim 6, wherein a concentration of ammonium sulfate in the nickel ammine sulfate complex solution is 100 to 500 g/l, and an ammonium concentration is 1.9 or more in a molar ratio based on a concentration of nickel in the complex solution.

10. The method for producing nickel powder according to claim 6, wherein the nickel sulfate solution produced by the solvent extraction step is the nickel sulfate solution in the seed crystal production step (1).

11. The method for producing nickel powder according to claim 6, further comprising at least one ammonia recovery step of adding an alkali to at least one post-reaction solution obtained in the reduction step (3) and/or in the growth step (4) and heating the resulting mixture to volatilize and recover ammonia gas.

12. The method for producing nickel powder according to claim 11, wherein the ammonia recovered in the ammonia recovery step is recycled as ammonia used for producing the nickel ammine sulfate complex solution used in the solvent extraction step and the complexing step, and as ammonia as an alkali used for mixing in the seed crystal production step (1).

13. The method for producing nickel powder according to claim 1, wherein the reduction step (3) and the growth step (4) are each performed by maintaining a temperature of 150 to 200° C. and a pressure of 1.0 to 4.0 MPa.

14. The method for producing nickel powder according to claim 1, further comprising:
- a nickel powder briquetting step of processing the high purity nickel powder obtained in the growth step (4) into nickel briquettes in a massive form using a briquetting machine; and
- a briquette sintering step of sintering the resulting nickel briquettes in a massive form under holding conditions at a temperature of 500 to 1200° C. in a hydrogen atmosphere to form nickel briquettes as a sintered body.

15. The method for producing nickel powder according to claim 1, further comprising at least one ammonium sulfate recovery step of concentrating at least one post-reaction solution obtained in the reduction step (3) and/or in the growth step (4) to precipitate ammonium sulfate and to recover ammonium sulfate crystals.

16. The method for producing nickel powder according to claim 1, wherein a dispersant is further added to the mixed slurry when the seed crystals are added to the nickel ammine sulfate complex solution to form a mixed slurry in the seed crystal addition step (2).

17. The method for producing nickel powder according to claim 1, wherein, in the seed crystal addition step (2), an amount of the seed crystals added is 1 to 100% based on a weight of nickel in the nickel ammine sulfate complex solution.

18. The method for producing nickel powder according to claim 1 the nickel ammine sulfate complex solution is obtained by:
- a leaching step of dissolving a nickel-containing material containing cobalt as an impurity;
- a solvent extraction step of adjusting pH of a leachate containing nickel and cobalt obtained in the leaching step and then separating the leachate into a nickel sulfate solution and a cobalt-recovering solution by solvent extraction; and
- a complexing step of subjecting the nickel sulfate solution to complexing treatment with ammonia.

19. The method for producing nickel powder according to claim 1, comprising at least one ammonia recovery step of adding an alkali to at least one post-reaction solution obtained in the reduction step (3) and/or in the growth step (4) and heating the resulting mixture to volatilize and recover ammonia gas.

* * * * *